(12) United States Patent
Kim et al.

(10) Patent No.: US 7,754,833 B2
(45) Date of Patent: Jul. 13, 2010

(54) PROCESS FOR POLYMERIZATION OR COPOLYMERIZATION OF ETHYLENE

(75) Inventors: Sang Yull Kim, Seoul (KR); Ho Sik Chang, Daejon (KR); Chun Byung Yang, Daejon (KR)

(73) Assignee: Samsung Total Petrochemicals Co., Ltd., Dokgod-ri, Daesan-up, Seosan-shi, Chungcheongnam Province (KR)

( * ) Notice: Subject to any disclaimer, the term of this patent is extended or adjusted under 35 U.S.C. 154(b) by 0 days.

(21) Appl. No.: 12/160,773

(22) PCT Filed: Dec. 28, 2006

(86) PCT No.: PCT/KR2006/005848

§ 371 (c)(1), (2), (4) Date: Sep. 23, 2008

(87) PCT Pub. No.: WO2007/081105

PCT Pub. Date: Jul. 19, 2007

(65) Prior Publication Data

US 2009/0221771 A1 Sep. 3, 2009

(30) Foreign Application Priority Data

Jan. 12, 2006 (KR) .................... 10-2006-0003449

(51) Int. Cl.
*C08F 4/44* (2006.01)
(52) U.S. Cl. .................................... 526/123.1
(58) Field of Classification Search ............... 526/123.1
See application file for complete search history.

(56) References Cited

U.S. PATENT DOCUMENTS

| | | | |
|---|---|---|---|
| 4,330,649 A | 5/1982 | Kioka et al. |
| 4,477,639 A | 10/1984 | Nielsen |
| 4,518,706 A | 5/1985 | Gessell |
| 4,784,983 A | 11/1988 | Mao et al. |
| 4,816,433 A | 3/1989 | Terano et al. |
| 4,829,037 A | 5/1989 | Terano et al. |
| 4,847,227 A | 7/1989 | Murai et al. |
| 4,970,186 A | 11/1990 | Terano et al. |
| 5,106,807 A | 4/1992 | Morini et al. |
| 5,130,284 A | 7/1992 | Terano et al. |
| 6,803,427 B2 | 10/2004 | Yang et al. |
| 6,855,663 B1 | 2/2005 | Yang |

FOREIGN PATENT DOCUMENTS

KR 20010053664 7/2001

*Primary Examiner*—Ling-Siu Choi
*Assistant Examiner*—Sonya Wright
(74) *Attorney, Agent, or Firm*—Barlow, Josephs & Holmes, Ltd.

(57) ABSTRACT

Provided is a process for polymerization and copolymerization of ethylene, specifically comprising carrying out polymerization or copolymerization ethylene in the presence of (a) a solid complex titanium catalyst which is produced by the process comprising: (i) preparing a magnesium compound solution by contacting a halogenated magnesium compound and an alcohol for allowing a reaction; (ii) reacting the resulted magnesium compound solution with an ester compound having at least one hydroxyl group and a silicon compound having at least one alkoxy group; (iii) reacting the resulted solution with a mixture of a titanium compound and a silicon compound to obtain a solid titanium catalyst component; (iv) washing the resulted solid titanium catalyst component with a halogenated saturated hydrocarbon compound; and (v) further reacting the washed solid titanium catalyst component with a titanium compound to obtain a solid complex titanium catalyst, and (b) an organometallic compound from Group II or III of Periodic table of elements. According to the present invention, it is possible to provide a process for polymerization or copolymerization of ethylene in which the catalyst activity is improved and a polymer of high bulk density is provided, with the use of a catalyst prepared by a simple process.

6 Claims, No Drawings

PROCESS FOR POLYMERIZATION OR COPOLYMERIZATION OF ETHYLENE

TECHNICAL FIELD

The present invention relates to a process for polymerization or copolymerization of ethylene, specifically to a process for polymerization or copolymerization of ethylene comprising the use of a solid complex titanium catalyst which is produced by reacting a magnesium compound solution with a mixture of a titanium compound and a silicon compound, washing the resulted a solid titanium catalyst component with a halogenated saturated hydrocarbon compound, and further reacting the resulted compound with a titanium compound.

BACKGROUND ART

High catalyst activity, high bulk density of a polymer and the like are important factors to be considered in a catalyst when applying it to a liquid and a gas phase polymerization. A Ziegler—Natta type catalyst comprising magnesium for polymerization and copolymerization of ethylene is known to provide high catalyst activity and a polymer of high bulk density, and to be suitable for a liquid and a gas phase polymerization, thereby having been widely used in preparation of polyethylene.

Processs for producing many titanium—based catalysts comprising magnesium for olefin polymerization have been reported. Especially, processs using a magnesium solution for obtaining a catalyst for polymerizing olefin with high bulk density have been widely known. For such examples, there have been processs for obtaining a magnesium solution by reacting a magnesium compound with an electron donor such as alcohol, amine, cyclic ether, organic carboxylic acid or the like, in the presence of a hydrocarbon solvent. Specifically, processs using an alcohol as an electron donor are disclosed in U.S. Pat. Nos. 4,330,649 and 5,106,807. Further, a process for producing a magnesium—supported catalyst by reacting such magnesium solution with a halogen—containing compound such as titanium tetrachloride is also well known in the art. Alternatively, there have been efforts to adjust the polymerization activity or molecular weight distribution of a polymer by using ester compounds in preparation of a catalyst.

However, these catalysts still need to be further improved in terms of catalyst activity, although they can provide high bulk density.

In consideration of improvement in catalyst activity, there have been U.S. Pat. Nos. 4,477,639 and 4,518,706, in which a cyclic ether, tetrahydrofuran is used as a solvent for a magnesium compound. In U.S. Pat. Nos. 4,847,227, 4,816,433, 4,829,037, 4,970,186 and 5,130,284, a catalyst for olefin polymerization which provides excellent polymerization activity and a polymer of high bulk density is disclosed, by reacting an electron donor such as magnesium alkoxide, dialkylphthalate, phthaloylchloride or the like with a titanium chloride compound. However, there still has been a need for a process for producing a catalyst for polymerization and copolymerization of ethylene which is more convenient and simpler, and can provide high catalyst activity and a polymer of high bulk density.

DISCLOSURE OF INVENTION

Technical Problem

However, these catalysts still need to be further improved in terms of catalyst activity, although they can provide high bulk density.

In consideration of improvement in catalyst activity, there have been U.S. Pat. Nos. 4,477,639 and 4,518,706, in which a cyclic ether, tetrahydrofuran is used as a solvent for a magnesium compound. In U.S. Pat. Nos. 4,847,227, 4,816,433, 4,829,037, 4,970,186 and 5,130,284, a catalyst for olefin polymerization which provides excellent polymerization activity and a polymer of high bulk density is disclosed, by reacting an electron donor such as magnesium alkoxide, dialkylphthalate, phthaloylchloride or the like with a titanium chloride compound. However, there still has been a need for a process for producing a catalyst for polymerization and copolymerization of ethylene which is more convenient and simpler, and can provide high catalyst activity and a polymer of high bulk density.

Technical Solution

The object of the present invention is to provide a process for polymerization or copolymerization of ethylene in which the catalyst activity is superior and a polymer of high bulk density is provided, with the use of a catalyst obtained by a simple preparation process.

The process for polymerization or copolymerization of ethylene according to the present invention comprises carrying out polymerization or copolymerization of ethylene in the presence of:

(a) a solid complex titanium catalyst which is produced by the process comprising:
  (i) preparing a magnesium compound solution by contacting a halogenated magnesium compound and an alcohol;
  (ii) reacting the resulted magnesium compound solution with an ester compound having at least one hydroxyl group and a silicon compound having at least one alkoxy group;
  (iii) reacting the resulted solution with a mixture of a titanium compound and a silicon compound to obtain a solid titanium catalyst component;
  (iv) washing the resulted solid titanium catalyst component with a halogenated saturated hydrocarbon compound; and
  (v) further reacting the washed solid titanium catalyst component with a titanium compound to obtain a solid complex titanium catalyst, and (b) an organometallic compound from Group II or III of Periodic table of elements.

In the above step (i), the kinds of halogenated magnesium compound include dihalogenated magnesium such as magnesium chloride, magnesium iodide, magnesium fluoride and magnesium bromide; alkyl magnesium halides such as methylmagnesium halide, ethylmagnesium halide, propylmagnesium halide, butylmagnesium halide, isobutylmagnesium halide, hexylmagnesium halide and amylmagnesium halide; alkoxy magnesium halides such as methoxymagnesium halide, ethoxymagnesium halide, isopropoxymagnesium halide, butoxymagnesium halide and octoxymagnesium halide; and aryloxymagnesium halides such as phenoxymagnesium halide and methylphenoxymagnesium halide. The magnesium compound is preferred to be used as a mixture of two or more, and is also effective in the form of a complex with other metals.

In most cases, the above-listed compounds can be represented as a simple chemical formula. In some cases, however, they cannot be represented as a simple formula depending on the process for producing a magnesium compound. In such cases, it can be generally considered as a mixture of the listed magnesium compounds. For example, the following compound may be used in the present invention: a compound which is obtained by reacting a magnesium compound with a polysiloxane compound, a halogen-containing silane compound, an ester, an alcohol or the like; and a compound which is obtained by reacting metal magnesium with an alcohol, phenol or ether in the presence of a halosilane, phosphoric(V) chloride or thionyl chloride. Preferred magnesium compounds include magnesium halides, particularly magnesium chloride, alkylmagnesium chloride, preferably having C1-10 alkyl group, alkoxymagnesium chloride, preferably having C1-10 alkoxy group, and aryloxymagnesium chloride, preferably having C6-20 aryloxy group.

The magnesium compound solution can be prepared by formulating one of the foregoing magnesium compounds to a solution with the use of an alcohol as a solvent, in the presence or absence of a hydrocarbon solvent. The hydrocarbon solvent which can be used herein includes: aliphatic hydrocarbons such as pentane, hexane, heptane, octane, decane and kerosene; alicyclic hydrocarbons such as cyclopentane, methylcyclopentane, cyclohexane and methylcyclohexane; aromatic hydrocarbons such as benzene, toluene, xylene, ethylbenezne, cumene and cymene; and halogenated hydrocarbons such as dichloropropane, dichloroethylene, trichloroethylene, tetrachlorocarbon and chlorobenzene.

When converting the magnesium compound into a magnesium compound solution, it is preferred to use an alcohol in the presence of the foregoing hydrocarbon. The alcohols which can be used herein include alcohols having C1-20 such as methanol, ethanol, propanol, butanol, pentanol, hexanol, octanol, decanol, dodecanol, octadecylalcohol, benzylalcohol, phenylethylalcohol, isopropylbenzylalcohol and cumylalcohol. Preferred alcohols are those having C1-12. Although the desired average size of a catalyst and the particle size distribution may vary upon the kinds and total amount of an alcohol, kinds of a magnesium compound, the ratio of magnesium and alcohol and the like, the total amount of the alcohol used to prepare a magnesium compound solution is desirably at least 0.5 mol, preferably about 1.0-20 mol, and more preferably about 2.0-10 mol, per mol of the magnesium compound.

The reaction between a magnesium compound and an alcohol in preparing a magnesium compound solution is preferably carried out in a hydrocarbon medium, and the reaction is desirably carried out at the temperature of −25° C. or higher, preferably −10-200° C., and more preferably around 0-150° C. for 15 minutes to 5 hours and preferably for 30 minutes to 4 hours, though the reaction temperature may vary according to the kinds and amount of an alcohol used.

As for the ester compound having at least one hydroxyl group used in the above step (ii), the following compounds can be used: unsaturated fatty acid esters having at least one hydroxyl group such as 2-hydroxy ethylacrylate, 2-hydroxy ethylmethacrylate, 2-hydroxy propylacrylate, 2-hydroxy propylmethacrylate, 4-hydoxy butylacrylate and pentaerythritol triacrylate; aliphatic monoesters or polyesters having at least one hydroxyl group such as 2-hydroxy ethyl acetate, methyl 3-hydroxy butyrate, ethyl 3-hydroxy butyrate, methyl 2-hydroxy isobutyrate, ethyl 2-hydroxy isobutyrate, methyl-3-hydroxy-2-methyl propionate, 2,2-dimethyl-3-hydroxy propionate, ethyl-6-hydroxy hexanoate, t-butyl-2-hydroxy isobutyrate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl 2-hydroxy caproate and diethyl bis-(hydroxy methyl)malonate; aromatic esters having at least one hydroxyl group such as 2-hydroxy ethyl benzoate, 2-hydroxy ethyl salicylate, methyl 4-(hydroxymethyl)benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol mono benzoate, diethylene glycol monobenzoate and triethylene glycol monobenzoate; and alicyclic esters having at least one hydroxyl group such as hydroxy butyl lactone. The amount of the ester compound having at least one hydroxyl group is 0.001-5 mol, and preferably 0.01-2 mol per mol of magnesium.

As for the silicon compound having at least one alkoxy group, which is another electron donor used in the above step (ii), compounds having the general formula of $R_n Si(OR)_{4-n}$, wherein R is a hydrocarbon group having C1-12, and n is an integer of 0-3, are preferred. Specifically, one or more compounds such as, for example, dimethyldimethoxy silane, dimethyldiethoxy silane, diphenyldimethoxy silane, methylphenyldimethoxy silane, diphenyldiethoxy silane, ethyltrimethoxy silane, vinyltrimethoxy silane, methyltrimethoxy silane, phenyltrimethoxy silane, methyltriethoxy silane, ethyltriethoxy silane, vinyltriethoxy silane, butyltriethoxy silane, phenyltriethoxy silane, ethyltriisopropoxy silane, vinyltributoxy silane, tetraethoxy silane, ethyl silicate, butyl silicate and methyltriaryloxy silane can be used. The amount of the silicon compound having at least one alkoxy group is preferably 0.05-3 mol, and more preferably 0.1-2 mol, per mol of the magnesium compound.

The reaction temperature for the contact reaction between a liquid magnesium compound solution with an ester compound having at least one hydroxyl group and an alkoxy silicon compound is preferably 0-100° C., and more preferably 10-70° C.

In the step (iii), the magnesium compound solution reacted with electron donors are further reacted with a mixture of a liquid titanium compound represented by the general formula of $Ti(OR)_a X_{4-a}$, in which R is a hydrocarbon group; X is a halogen atom; and a is an integer of 0-4, and a silicon compound represented by the general formula of $R_n SiCl_{4-n}$, in which R is a hydrogen atom, an alkyl group having C1-10, alkoxy, haloalkyl, aryl group, or halosilyl group having C1-8 or halosilylalkyl group; and n is an integer of 0-3, so as to recrystallize catalyst particles. In the above general formula, R is preferably an alkyl group having C1-10.

The titanium compounds of the general formula $Ti(OR)_a X_{4-a}$ include: tetra-halogenated titanium such as $TiCl_4$, $TiBr_4$ and $TiI_4$; trihalogenated alkoxytitanium such as $Ti(OCH_3)Cl_3$, $Ti(OC_2H_5)Cl_3$, $Ti(OC_2H_5)Br_3$ and $Ti(O(i-C_4H_9))Br_3$; dihalogenated alkoxytitanium such as $Ti(OCH_3)_2Cl_2$, $Ti(OC_2H_5)_2Cl_2$, $Ti(O(i-C_4H_9))_2Cl_2$ and $Ti(OC_2H_5)_2Br_2$; tetraalkoxytitanium such as $Ti(OCH_3)_4$, $Ti(OC_2H_5)_4$ and $Ti(OC_4H_9)_4$. Mixtures of the above-listed titanium compounds may also be used in the present invention. Preferred titanium compound is a halogen-containing titanium compound, and more preferred is a titanium tetrachloride.

The silicon compounds of the general formula $R_n SiCl_{4-n}$ include: silicon tetrachloride; trichlorosilanes such as methyltrichlorosilane, ethyltrichlorosilane and phenyltrichlorosilane; dichlorosilanes such as dimethyldichlorosilane, diethyldichlorosilane, diphenyldichlorosilane and methylphenyldichlorosilane; monochlrorosilanes such as trimethylchlrorosilane. Mixtures of the above-listed silicon compounds may also be used in the present invention. Preferred silicon compound is silicon tetrachloride.

The amount of the mixture of a titanium compound and a silicon compound used for the recrystallization of a magnesium compound solution is suitably 0.1-200 mol, preferably 0.1-100 mol, and more preferably 0.2-80 mol, per mol of the magnesium compound. The molar ratio of the silicon compound to the titanium compound is preferably 0.05-0.95, and more preferably 0.1-0.8. The shape and size of the recrystallized solid component vary depending on the reaction conditions when reacting the magnesium compound solution with the mixture of a titanium compound and a silicon compound. Therefore, it is desirable to carry out the reaction between the magnesium compound solution and the mixture of a titanium compound and a silicon compound at sufficiently low temperature to form a solid component. The contact reaction is preferably carried out at −70-70° C., and more preferably at −50-50° C. After the contact reaction, the reaction temperature was gradually elevated to 50-150° C. for sufficient reaction for 0.5-5 hours.

The kinds of the halogenated saturated hydrocarbon compounds used in the step (iv) include compounds with C1-10 comprising one or more halogens including chlorine, bromine, fluorine and iodine, such as ethyldichloride, chloroform, tert-butyl chloride, tetrachloromethane, ethylbromide, tert-butyliodide, n-butylbromide, n-butyliodide and n-butylfluoride, and preferred is ethyldichloride. Mixtures of one or more said halogenated saturated hydrocarbon can be used in the present invention.

The washing process by using the halogenated saturated hydrocarbon is carried out 1-5 times, and preferably 1-3 times. The temperature during the washing process is 10-120° C., and preferably 20-100° C.

In the step (v), the solid catalyst particle obtained from the step (iv) is further reacted with a titanium compound. The titanium compound used in step (v) is compounds represented by the general formula $Ti(OR)_aX_{4-a}$, in which R is a hydrocarbon group; X is a halogen atom; and a is an integer of 0-4, and is preferably a titanium halide and halogenated alkoxy titanium of which the alkoxy group has 1-20 carbon atoms and more preferably titanium tetrachloride.

The amount of the titanium compound is used in step (v) is suitably 1-20 mol, and preferably 1-10 mol, per mol of the magnesium compound. The reaction is preferably carried out in the temperature range of 40-150° C. for 0.5-5 hours.

The (a) solid complex titanium catalyst can be used in prepolymerization of ethylene or α-olefin, before being used as an element for (co)polymerization. Prepolymerization can be carried out in the presence of said catalyst and an organoaluminum compound such as triethylaluminum in a hydrocarbon solvent such as hexane, under the conditions of sufficiently low temperature and pressure. The prepolymerization helps the catalyst maintain its shape by surrounding the catalyst particles with polymers, thereby improving the polymer morphology after polymerization. The weight ratio of polymer/catalyst, after prepolymerization is 0.1-20:1.

The polymerization or copolymerization of ethylene process of the present invention is conducted by using a catalyst system comprising (a) a solid complex titanium catalyst prepared as described above, and (b) an organometallic compound from Group II or III of the Periodic table of elements. Particularly, the catalyst (a) is advantageously used in homopolymerization of ethylene and copolymerization of ethylene with α-olefins which have 3 or more carbon atoms, such as propylene, 1-butene, 1-pentene, 4-methyl-1-pentene and 1-hexene.

The organometallic compound (b) useful in the present invention is represented by the general formula of $MR_n$, wherein M is a metal component from Group II or IIIA of the Periodic table of elements such as magnesium, calcium, zinc, boron, aluminum and gallium; and R is an alkyl group having C1-20 such as methyl, ethyl, butyl, hexyl, octyl and decyl; and n is the atomic valence of the metal component. More preferred organometallic compound is trialkylaluminum compounds having C1-6 such as triethylaluminum and triisobutylaluminum and the mixtures thereof. Optionally, organoaluminum compounds comprising one or more halogens or hydride groups such as ethylaluminum dichloride, diethylaluminum chloride, ethylaluminum sesquichloride and diisobutylaluminum hydride may be used.

Polymerization can be carried out by a gas phase or a bulk polymerization in the absence of an organic solvent, or by a liquid slurry polymerization in the presence of an organic solvent.

In gas phase polymerization, the concentration of the solid complex titanium catalyst (a) in the polymerization reaction system is, based on titanium atoms of the catalyst in 1 L solvent, about 0.001-5 mmol, preferably about 0.001-1.0 mmol, and more preferably about 0.01-0.5 mmol. The concentration of the organometallic compound (b) in the polymerization reaction system is, calculated as metal atoms, about 1-2,000 mol, preferably about 5-500 per mol of a titanium atom in the catalyst.

In liquid slurry polymerization, the solvent is preferably a non-polar organic solvent including alkane compounds such as hexane, n-heptane, octane, nonane and decane, and aromatic compounds such as cycloalkane, and more preferably hexane. These solvents are preferred to be purified before its use, in order not to affect to the catalyst activity. The concentration of the solid complex titanium catalyst (a) in the polymerization system is, based on titanium atoms of the catalyst in 1 L solvent, about 0.001-5 mmol, and preferably 0.001-0.5 mmol.

The polymerization reaction is carried out at sufficiently high temperature regardless of the types of polymerization process, for achieving high polymerization rate. Generally, the reaction temperature is about 20-200° C., and more preferably about 20-95° C. The pressure of monomers during polymerization is preferably 1-100 atm., and more preferably 2-50 atm.

In the present invention, the molecular weight is represented as melting index (MI; 230° C., 2.16 kg)(ASTM D 1238), which is a generally known unit for molecular weight in this field of art. Generally, the lower the molecular weight, the bigger the MI value.

Mode for Invention

Hereinafter, the present invention is further described in detail, referencing the following examples. However, the scope of the present invention is by no means limited by these examples which have only illustrative purposes.

EXAMPLES

Example 1

Preparation of Catalyst

A solid complex titanium catalyst was prepared by the following steps.

(i) Preparation of a Magnesium Compound Solution 9.5 g of $MgCl_2$ and 600 ml of decane were added into a 1.0 L reactor equipped with a mechanical stirrer, of which atmosphere was substituted with nitrogen, and then the mixture was stirred at 500 rpm. Then, after 70 ml of 2-ethylhexanol was added thereto, the temperature was elevated to 120° C. for allowing the reaction for 3 hours. After the reaction, the resulted homogenous solution was cooled to room temperature (25° C.).

(ii) Contact Reaction Between the Magnesium Compound Solution with Ester Having a Hydroxyl Group and an Alkoxy Silane Compound To the magnesium compound solution cooled to 25° C., 0.8 ml of 2-hydroxyethyl methacrylate and 15.0 ml of tetraethoxy silane were added and the mixture was allowed for reaction for 1 hour.

(iii) Treating the Solution with a Mixture of a Titanium Compound and a Silicon Compound The resulted solution was adjusted to room temperature (25° C.), a mixture of 50 ml of titanium tetrachloride and 50 ml of silicon tetrachloride was added dropwise over 1 hour. Completing the addition, the temperature of the reactor was elevated to 70° C. and maintained for 1 hour. After lowering the temperature of the reactor to 60° C., the upper phase of the solution was separated out.

(iv) Washing the Resulted Catalyst Component with a Halogenated Saturated Hydrocarbon Compound To the remained solid phase, 400 ml of ethyldichloride were added, then the temperature was raised to 60° C. and the resulted mixture was stirred. Stirring was halted to separate the upper phase of the solution. This process was repeated three times.

(v) Reaction with a Titanium Compound 300 ml of decane and 100 ml of titanium tetrachloride were added thereto, and the temperature was elevated to 100° C. and maintained for 2 hours. Then, the reactor was cooled to the room temperature and 400 ml of hexane were added to the reactor for washing, until the unreacted free titanium tetrachloride was removed. The titanium content in the resulted solid complex titanium catalyst was 5.5 wt %.

Polymerization

A autocrave reactor having 2 L volume was dried in an oven and assembled while it was still hot. The atmosphere inside the reactor was substituted with nitrogen by alternately applying nitrogen and vacuum three times. 1,000 ml of dried n-hexane, 3 mmol of triethylaluminum, 0.03 mmol of a solid complex titanium catalyst, based on the titanium atom and 1,000 ml of hydrogen were subsequently added in this order to the reactor. A stirrer was operated at a constant speed of 700 rpm. The temperature of the reactor was elevated to 80° C., and the pressure of ethylene was adjusted to 80 psi. Then polymerization was carried out over 1 hour. After completing polymerization, the temperature of the reactor was lowered to room temperature, and excessive amount of an ethanol solution was added to the polymerized product so as to terminate the reaction. The resulted polymers were filtered for separation, collected and dried in a vacuum oven at 50° C. for 6 hours or more to obtain polyethylene as a white powder.

The polymerization activity (kg polyethylene/g catalyst) was calculated as the weight (kg) of the obtained polymers per the amount (g) of a catalyst used therein, and it is represented in the following Table 1 together with other results of MI (g/10 minutes), bulk density (BD) (Mw/Mn) and loading amount (wt %).

Example 2

A catalyst was prepared by the same process as in Example 1, except that the washing process was repeated twice in the step (iv) of the preparation of catalyst in Example 1. Polymerization was carried out as in Example 1. The results were represented in the following Table 1.

Example 3

A catalyst was prepared by the same process as in Example 1, except that the washing process was performed only once in the step (iv) of the preparation of catalyst in Example 1. Polymerization was carried out as in Example 1. The results were represented in the following Table 1.

Example 4

A catalyst was prepared by the same process as in Example 1, except that the washing process was carried out at 25° C. in the step (iv) of the preparation of catalyst in Example 1. Polymerization was carried out as in Example 1. The results were represented in the following Table 1.

Example 5

A catalyst was prepared by the same process as in Example 1, except that the washing process was carried out at 40° C. in the step (iv) of the preparation of catalyst in Example 1. Polymerization was carried out as in Example 1. The results were represented in the following Table 1.

Comparative example 1

A catalyst was prepared by the same process as in Example 1, except that the step (iv) of the catalyst preparation in Example 1 was not carried out. Polymerization was carried out as in Example 1. The results were represented in the following Table 1.

TABLE 1

| | Number of washing | Washing temperature (° C.) | Activity (kg polyethylene/ g catalyst) | MI (g/10 min.) | BD (Mw/ Mn) | loading amount (wt %) |
|---|---|---|---|---|---|---|
| Ex. 1 | 3 | 60 | 5.5 | 2.7 | 0.37 | 5.5 |
| Ex. 2 | 2 | 60 | 5.4 | 2.8 | 0.37 | 5.4 |
| Ex. 3 | 1 | 60 | 5.2 | 3.0 | 0.36 | 5.0 |
| Ex. 4 | 3 | 25 | 4.8 | 3.3 | 0.35 | 5.0 |
| Ex. 5 | 3 | 40 | 5.0 | 3.5 | 0.35 | 5.2 |
| Com. Ex. 1 | 0 | — | 4.8 | 3.6 | 0.35 | 4.9 |

INDUSTRIAL APPLICABILITY

According to the present invention, it is possible to provide a process for polymerization of copolymerization of ethylene in which the catalyst activity is superior, and high bulk density is provided by the use of a catalyst obtained by a simple preparation process.

What is claimed is:

1. A process for polymerizing or copolymerizing ethylene comprising carrying out polymerization or copolymerization of ethylene in the presence of (a) and (b):
   (a) a solid complex titanium catalyst which is produced by the process comprising:
   (i) preparing a magnesium compound solution by contacting a halogenated magnesium compound and an alcohol;
   (ii) reacting the resulted magnesium compound solution with an ester compound having at least one hydroxyl group and a silicon compound having at least one alkoxy group;
   (iii) reacting the resulted solution with a mixture of a titanium compound and a silicon compound to obtain a solid titanium catalyst component;
   (iv) washing the resulted solid titanium catalyst component with a halogenated saturated hydrocarbon compound; and (v) further reacting the washed solid titanium catalyst component with a titanium compound to obtain a solid complex titanium catalyst, and (b) an organometallic compound from Group II or III of Periodic table of elements.

2. The process for polymerizing or copolymerizing ethylene according to claim 1, wherein the ester compound having at least one hydroxyl group is selected from the group consisting of unsaturated fatty acid esters having at least one hydroxyl group, aliphatic monoesters or polyesters having at least one hydroxyl group, aromatic esters having at least one hydroxyl group, and alicyclic esters having at least one hydroxyl group; and the silicon compound having at least one alkoxy group is at least one selected from alkoxy silane compounds represented by the general formula of $R_n(OR)_{4-n}$, wherein R is a hydrocarbon group having C1-12, and n is an integer of 0-3.

3. The process for polymerizing or copolymerizing ethylene according to claim 1, wherein the titanium compound and the silicon compound are represented by each general formula of $T(OR)_aX_{4-a}$, in which R is a hydrocarbon group; X is a halogen atom; and a is an integer of 0-4, and $R_nSiC_{4-n}$, in which R is a hydrogen atom, an alkyl group having C1-10, alkoxy, haloalkyl, aryl group, or halosilyl group having C1-8 or halosilylalkyl group; and n is an integer of 0-3.

4. The process for polymerizing or copolymerizing ethylene according to claim 3, wherein the titanium compound is at least one selected from the group consisting of $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$ and $Ti(OC_4H_9)_4$.

5. The process for polymerizing or copolymerizing ethylene according to claim 1, wherein the halogenated saturated hydrocarbon compound is at least one selected from the group consisting of ethyldichloride, chloroform, ter-butyl chloride, tetrachloromethane, ethylbromide, tert-butyliodide, n-butylbromide, n-butyliodide and n-butylfluoride.

6. The process for polymerizing or copolymerizing ethylene according to claim 1, wherein the washing process using a halogenated saturated hydrocarbon compound in the step (iv) is repeated once to 5 times.

* * * * *